US010248923B2

United States Patent
Bester et al.

(10) Patent No.: US 10,248,923 B2
(45) Date of Patent: Apr. 2, 2019

(54) BUSINESS PROCESS MODELING BASED ON NETWORK TRAFFIC

(71) Applicant: CISCO TECHNOLOGY, INC., San Jose, CA (US)

(72) Inventors: Joseph Bradley Bester, Alpharetta, GA (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

(21) Appl. No.: 14/727,687

(22) Filed: Jun. 1, 2015

(65) Prior Publication Data

US 2016/0350683 A1 Dec. 1, 2016

(51) Int. Cl.
*G06F 15/173* (2006.01)
*G06Q 10/06* (2012.01)
*H04L 12/931* (2013.01)

(52) U.S. Cl.
CPC ....... *G06Q 10/0633* (2013.01); *G06Q 10/067* (2013.01); *H04L 49/20* (2013.01)

(58) Field of Classification Search
CPC ........... H04L 67/10; G06F 9/48; G06F 9/4451
USPC ................................................ 709/224-225
See application file for complete search history.

(56) References Cited

U.S. PATENT DOCUMENTS

| 8,645,276 B2 | 2/2014 | Wong et al. |
| 2002/0038228 A1 | 3/2002 | Waldorf et al. |
| 2002/0062237 A1 | 5/2002 | Matsumoto et al. |
| 2003/0014464 A1* | 1/2003 | Deverill ............... G06F 11/3419 718/101 |
| 2003/0072263 A1* | 4/2003 | Peterson ................. H04L 29/06 370/235 |
| 2004/0046785 A1* | 3/2004 | Keller ................... G06F 9/5061 715/734 |
| 2006/0274760 A1* | 12/2006 | Loher ................. H04M 3/2236 370/395.52 |
| 2009/0018877 A1* | 1/2009 | Houck ................... G06Q 10/00 705/7.11 |

(Continued)

OTHER PUBLICATIONS

Levina, et al., "Network-based Business Process Analysis," 2012 45th Hawaii International Conference on System Sciences, IEEE Computer Society, Jan. 4-7, 2012, 10 pages; http://www.computer.org/csdl/proceedings/hicss/2012/4525/00/4525e356.pdf.

(Continued)

*Primary Examiner* — Duyen M Doan

(57) ABSTRACT

The present disclosure describes approaches for generating an information model of a business process. One example is a method comprising receiving an input of an identifier, wherein the identifier corresponds to a node in a network; recursively tracing data packets in the network, wherein the identifier is utilized as a seed for the tracing; and generating an information model of the business process based on the data packets. In further examples, the recursively tracing data packets in the network comprises: identifying, based on the identifier, data packets transferred between the node and one or more nodes; retrieving, from the data packets, one or more identifiers corresponding to the one or more nodes; and identifying, based on the one or more identifiers, additional data packets transferred between the one or more nodes and one or more additional nodes.

20 Claims, 6 Drawing Sheets

(56) References Cited

U.S. PATENT DOCUMENTS

| | | | |
|---|---|---|---|
| 2010/0280863 A1 | 11/2010 | Wilcock et al. | |
| 2011/0029657 A1* | 2/2011 | Gueta | H04L 43/026 709/224 |
| 2013/0212255 A1* | 8/2013 | Chao | H04L 41/083 709/224 |
| 2015/0180755 A1* | 6/2015 | Zhang | H04L 43/0858 370/244 |
| 2016/0337225 A1* | 11/2016 | Bernoth | H04L 43/10 |

OTHER PUBLICATIONS

Trier, "Towards Dynamic Visualization for Understanding Evolution of Digital Communications Networks," Information Systems Research, Sep. 2008, 30 pages; http://cmxp.bplaced.net/Commetrix/enron/PREFINALDRAFT_MTRIER_DYNAMIC_VISUALIZATION_ONLINE_COMMUNICATION.pdf.

* cited by examiner

BUSINESS PROCESS MODELING BASED ON NETWORK TRAFFIC

TECHNICAL FIELD

This disclosure relates in general to the field of communications and, more particularly, to generating a model of a business process based on network traffic in a network.

BACKGROUND

Modern networking technology often utilizes network switches (or switches) to transmit data between two or more nodes. The network switches, at least in part, define a network. In some networks, the nodes connect to the network and rely on the switches to transmit messages to other nodes, hosts, and/or to other networks. Collectively, the switches (also called the 'network fabric' or 'fabric') handle transmission of data packets over the network. The network fabric inspects the contents of the data traffic (e.g., data packets) in the network to determine where to transmit the data traffic.

Networks often support many nodes (e.g., client devices, servers, endpoints, network elements) that are used in the operation of a business and/or enterprise. Such nodes can be utilized to performing business processes such as acquiring orders, fulfilling orders, shipping products, and the like. Like all other data traffic in a network, any data traffic generated in the course of business processes is transmitted through the network via the network fabric. The network fabric facilitates business operations and transmission of network traffic associated with business processes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
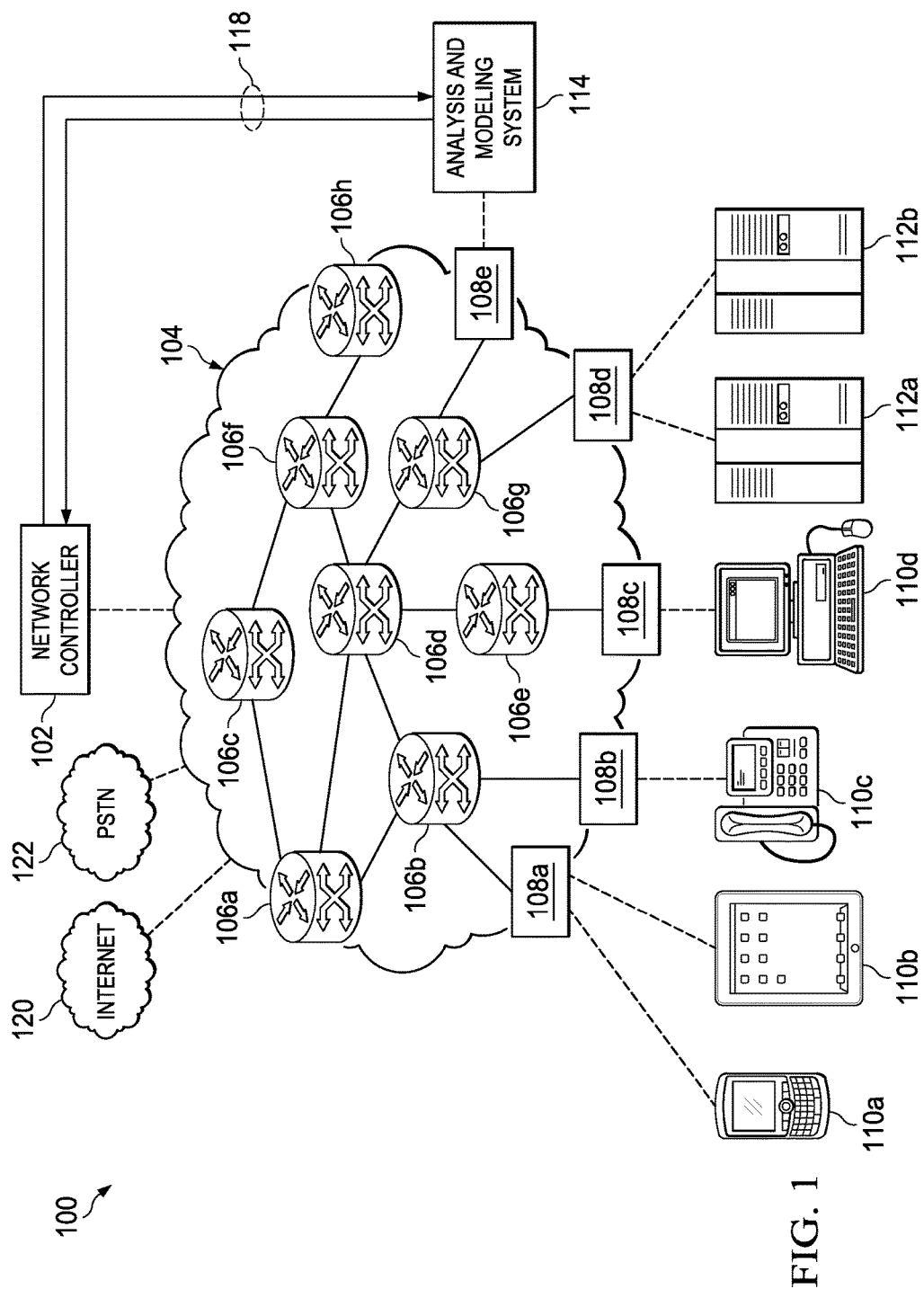
FIG. 1 is a simplified diagram of a communication system in accordance with some embodiments of the present disclosure.

The present disclosure describes approaches for generating an information model of a business process. One example is a method comprising receiving an input of an identifier, wherein the identifier corresponds to a node in a network; recursively tracing data packets in the network, wherein the identifier is utilized as a seed for the tracing; and generating an information model of the business process based on the data packets. In further examples, the recursively tracing data packets in the network comprises: identifying, based on the identifier, data packets transferred between the node and one or more nodes; retrieving, from the data packets, one or more identifiers corresponding to the one or more nodes; and identifying, based on the one or more identifiers, additional data packets transferred between the one or more nodes and one or more additional nodes.

Another example is a system comprising a memory element storing electronic code and a processor coupled to the memory element and operable to execute the electronic code. The processor, when executing the electronic code, performs operations comprising: receiving an input of an identifier, wherein the identifier corresponds to a node in a network; recursively tracing data packets in the network, wherein the identifier is utilized as a seed for the tracing; and generating an information model of the business process based on the data packets. In further examples, the recursively tracing data packets in the network comprises: identifying, based on the identifier, data packets transferred between the node and one or more nodes; retrieving, from the data packets, one or more identifiers corresponding to the one or more nodes; and identifying, based on the one or more identifiers, additional data packets transferred between the one or more nodes and one or more additional nodes.

Yet another example is a computer-readable non-transitory medium comprising one or more instructions, that when executed on a processor configure the processor to perform one or more operations comprising: receiving an input of an identifier, wherein the identifier corresponds to a node in a network; recursively tracing data packets in the network, wherein the identifier is utilized as a seed for the tracing; and generating an information model of the business process based on the data packets. In further examples, the recursively tracing data packets in the network comprises: identifying, based on the identifier, data packets transferred between the node and one or more nodes; retrieving, from the data packets, one or more identifiers corresponding to the one or more nodes; and identifying, based on the one or more identifiers, additional data packets transferred between the one or more nodes and one or more additional nodes.

Example Embodiments

Business operators spend time and resources to accurately assess the business processes that are performed in the course of operating their business. In some cases, a business operator may hire a consultant to manually determine a set of business processes, provide limited statistics regarding the business processes (e.g., average duration of time from start to completion of a process), and provide recommendations for improving the efficiency of a process. Such consultants' manual tasks for determining the business processes and recommendations may include in-person interviews and shadowing (e.g., accompany an employee throughout a portion of their work to observe their daily tasks) with employees who perform the business processes. A problem with manually identifying and assessing business processes is that such manual approaches are not only time consuming but also produce only a static assessment of the business processes. Moreover, such manual approaches often rely on self-reporting (e.g., an employee describes how they perform their job using network resources). However, self-reporting can be unreliable (e.g., due to employees not following a company protocol but falsely reporting that they follow the procedure). The time and cost associated with manual assessments prevent many business owners from performing such assessments on an ongoing basis. Moreover, because the results of such assessments are static (and are neither real-time nor instantaneously updated on-demand), the assessments are quickly out-of-date and may require further manual updates.

Some systems attempt to address the issues associated with the aforementioned manual approaches by automating a portion of assessing business processes. Some such systems require that a business process has already been identified (i.e., the business process is known in advance of performing the assessment) and/or that a representation of the business process is provided as an input to the system. For example, these systems may require an input of an object-oriented information model of a business process (e.g., modeled as a series of steps). These systems may attempt to identify, based on the input model of the business process, instances of the process that are performed using system resources. For example, such systems may monitor system resources to detect when a device performs any step of the business process and may generate statistics associated the known business processes. However, such systems may have limited applicability in cases where the business processes are unknown. These systems fail to (e.g., automatically) discover business processes that are being executing in the operation of a business and/or in a network fabric. Instead, these systems require manual input of the business processes before the system can perform any assessment. Consequently, a technical challenge facing many business operators and/or network operators is how to discover the business processes that are being executing during the operation of a business and/or in a network fabric (e.g., when the processes are unknown to the operator and/or the processes are changing).

A solution to the above problems (and others) is to generate a model of a business process based on data packets that traverse a network fabric. Because employees use nodes (e.g., devices, applications, servers, endpoints, network elements, etc.) to perform business processes, data exchanges between those nodes can be utilized as a basis for generating a model of the business processes. A node is inclusive of an endpoint and/or a network element. Moreover, because the network fabric transmits network traffic (e.g., as data packets) between nodes, the network fabric can access (e.g., read, modify, copy, redirect, and the like) the network traffic for use in an analysis and modeling system for generating and/or analyzing models of business processes, as disclosed herein. The traffic from these nodes traverses the physical data systems network and can be captured in the network fabric to correlate to individual time stamps, processing latency, retransmissions, duplication, and any other (desirable or undesirable) traffic patterns. By collecting and analyzing the traffic during its traversal through the network fabric, the systems, methods, and apparatuses disclosed herein can generate, in (near) real-time, a model of business processes being performed by nodes in within the network. Moreover, once a model has been established (e.g., verified based on statistical analysis and/or an input verifying a business process), the model can analyzed against an archetype business process (e.g., to expose inefficiencies, to identify characteristics of a business application implementation, to identify characteristics of the business process, and the like). In some examples, the systems, methods, and apparatuses disclosed herein can generate of a model of a (previously unidentified) business process based only on a single identifier, where the single identifier identifies a node within a network. It is noted that the terms 'data packet' and 'packet' are used interchangeably throughout the present disclosure. Both terms are inclusive of the broad concept of a data packet including (but not limited to) a User Datagram Protocol (UDP) packet, a Transmission Control Protocol (TCP) packet, and/or an Internet Protocol Packet. Packets include (e.g., in a header) at least one field that specifies a source of the packet (e.g., a source address and/or source port), at least one other field that specifies a destination of the packet (e.g., a destination address and/or destination port), and a payload, which is data carried within the packet (e.g., such as application data within the packet).

Turning to FIG. 1, FIG. 1 is a simplified diagram of a communication system 100 for generating a model of a business process in a network. In specific implementations, communication system 100 can be provisioned for generating, analyzing, hosting, and/or otherwise providing information models of business processes. In certain scenarios (many of which are detailed below), communication system 100 may generate of a model of a (previously unidentified) business process based only on a single identifier, where the single identifier identifies a node within a network. Communication system 100 includes (among other things) a network 104, a network controller 102, a plurality of nodes (e.g., endpoints 110a-d, network elements 112a-b, network switches 106a-h) Internet 120, a telephony network 122, network access points 108a-e, and an analysis and modeling system 114.

The network 104 comprises, among other things, network switches 106a-h. The term 'network fabric' as used herein is inclusive of the set of network switches 106a-h. The network fabric implements both a control plane and a data plane. The control plane may comprise a communication protocol (e.g., a routing protocol) used to communicate routing data (e.g., routing tables or portions thereof) to between network switches or other network elements (such as router, servers, and the like). The data plane, or forwarding plane, may comprise processes and/or algorithms (e.g., executed by the network switches 106a-h) that utilize routing or switching information (e.g., tables) to decide where an incoming data packet should be next transmitted. Switches in the network fabric utilize the control plane to disseminate information regarding network paths (e.g., to share routing and/or switching information with one another).

Communication system 100 includes any number of endpoints 110a-d that can achieve suitable network connectivity to the network 104 via various points of attachment (e.g., network access points 108a-e). Communication system 100 also includes any number of network elements 112a-b for provisioning data (e.g., to any one or more of endpoints 110a-d). In this example, the network elements 112a-b are servers for providing data and applications to the endpoints over the network 104. In this particular example, communication system 100 is operably coupled to the Internet 120, the telephony network 122 (e.g., a public switched telephony network, or PSTN). The network fabric can transfer data to and/or from the Internet and telephony data (e.g., voice over Internet protocol (VoIP) data) between various endpoints and network elements. For example, when a call is initiated (and/or received) by endpoint 110c and/or 110a, the call may traverse the PSTN, a VoIP gateway in the network 104, or any other series of actions, which establish the call. Any voice data associated with the call traverses one or more of the network switches 106a-h during transmission to and/or from the endpoints. Thus, the network fabric can access not only data associated with visual and textual electronic communications (e.g., emails, instant messages, text messages (e.g., SMS), data flows between applications and network systems) but also can access data associated with audio electronic communications (e.g., phone calls, voicemails, virtual meetings, telephone conference calls, digital audio signals, and the like). In some examples, such audio data may be processed (e.g., by the analysis and modeling system 114) using signal-processing algorithms to generate text from the audio data (e.g., voice recognition, speech to text, and the like). Such techniques may be utilized to transform the audio data to textual data for correlation with other data (e.g., payloads of data packets) detected in the network 104.

The network controller 102 is a network element operable to control the nods in the network 104 (e.g., by administering network policies). The network controller 102 is operably coupled to the network 104 (e.g., by a communication channel). The network controller 102 can utilize the control plane to communicate with the network switches 106a-h. For example, the network controller 102 can transmit data (e.g., instructions, policies, routing tables, switching tables, port mirroring settings, or individual entries for a routing/switching table) to and retrieve data (e.g., operational status, hardware usage statistics, routing tables, policies, routing tables, switching tables, or individual entries of a routing/switching table) from the network switches 106a-h. In addition, the network controller 102 is operably coupled to the analysis and modeling system 114 by a communication channel 118. In some examples, the network controller 102 is a software defined networking (SDN) controller that utilizes a southbound interface to control the network 104. The analysis and modeling system 114 is operable to generate a model of one or more business processes based on data received via the network 104. The network fabric and the analysis and modeling system 114 may discover one another using known protocols such as Dynamic Host Configuration Protocol (DHCP), Preboot eXecution Environment (PXE), Address Resolution Protocol (ARP), and/or through configuration by an operator or external process. The analysis and modeling system 114 is further discussed below (e.g., with reference to FIG. 2).

The communication channel 118 enables bidirectional communication between the network controller 102 and the analysis and modeling system 114. For example, the system 114 may analyze network traffic collected from the network 104 to generate an input (e.g., an identifier of a node such as a network element and/or an endpoint; a policy) for transmission to the network controller (e.g., which the network controller can utilize, at least in part, to program the network switches using the control plane) over the communication channel 118. As another example, the network controller 102 can transmit data to the system 114 using the communication channel 118. In some specific examples, the network controller 102 may retrieve, using the control plane, the data from the network switches 106a-h over the communication channel 118. As used herein, a "communication channel" encompasses a physical transmission medium (e.g., a wire), or a logical connection (e.g., a radio channel) used to convey information signals (e.g., data packets, control packets, etc.) from one or more senders to one or more receivers. A communication channel, as used herein, can include one or more communication links, which may be physical (e.g., wire) or logical (e.g., data link, wireless link, etc.). Termination points of communication channels can include interfaces such as Ethernet ports, serial ports, virtual ports, etc. In some examples, each communication channel may be a single channel: deployed for both control plane messages and data plane messages.

The network switches 106a-h may transmit data (e.g., data packets or portions thereof) to the analysis and modeling system 114 (e.g., transmitted using the data plane). Such data may be data copied from network traffic associated with nodes identified in a list (e.g., a list of identifiers used for recursive analysis by the system 114, as will be discussed further below).

In operation, the network controller 102 can receive an input of a policy and may, in turn, utilize the control plane to transmit instructions to the network fabric (e.g., wherein the network fabric executes the instructions to implement the policy). For example, the network controller 102 may receive an input of an identifier of a node. The identifier can be utilized for copying and transmitting, to the analysis and modeling system 114, data traffic associated with the identifier. In addition, the network controller utilizes the protocols of the control plane to program and/or reprogram one or more network switches in the network fabric based on the identifier. Such programming and/or reprogramming may comprise using a control plane protocol to modify an existing routing table, switching table and/or mirroring table utilized by the network switches (e.g., and, thereby, instruct the network switches to transmit, to the system 114, copies of data packets associated with the identifier). In some cases, the network controller 102 receives feedback information from the analysis and modeling system 114 (via communication channel 118). The feedback information may be utilized to which is utilized to program specific switches in the network 104 in based on execution of a feedback loop.

Figure 2:
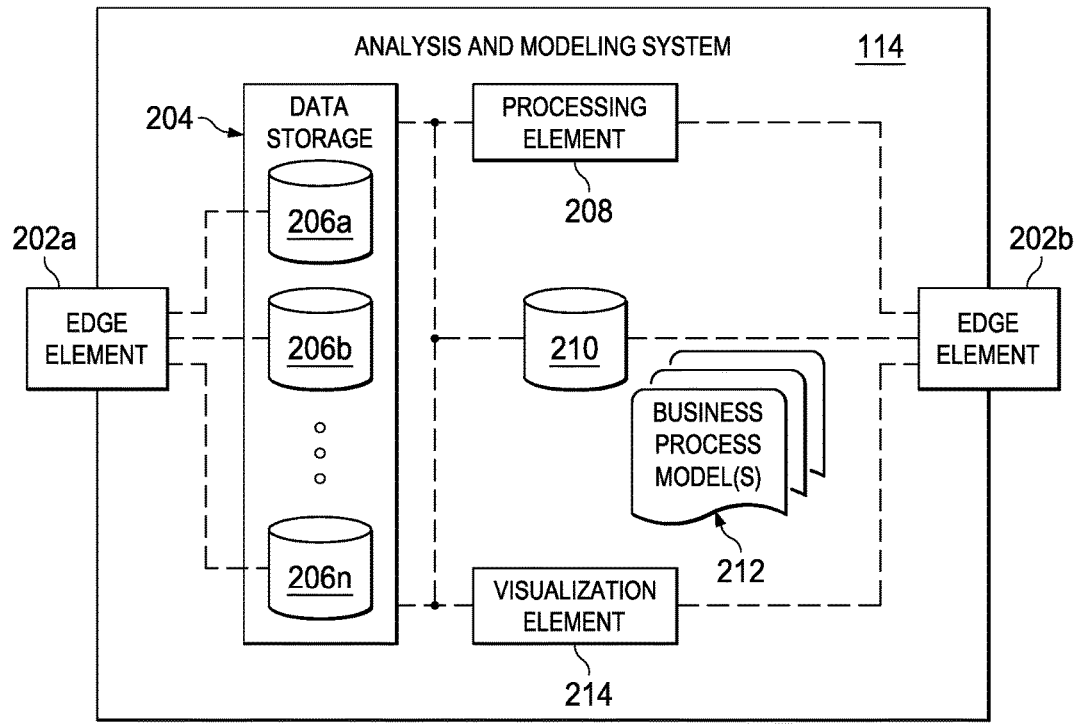
FIG. 2 is a simplified schematic diagram of the analysis and modeling system of FIG. 1 associated with possible implementations of the communication system.

Turning to FIG. 2, FIG. 2 is a simplified schematic diagram of the analysis and modeling system 114 associated with possible implementations of the communication system 100. In some implementations, the analysis and modeling system 114 is a cluster of coupled network elements, collectively identified as an Integrated Business Process Analysis and Modeling (IBPAM) system. The analysis and modeling system 114 can receive data from the network fabric (e.g., any one or more of network switches 106a-h in FIG. 1) and generate, based on the data, a model of one or more business processes. The analysis and modeling system 114 comprises, among other things, edge elements 202a and 202b, data storage system 204, a processing element 208, a model data store 210, and a visualization element 214. The data storage system 204 comprises memory elements 206a-n (e.g., where n represents a variable number of memory elements; n being any whole number greater than zero). The data storage system (and/or the individual memory elements) may implement a database management system, such as HADOOP (marketed by APACHE), SQL, MySQL, or others.

As described with above, the network fabric (e.g., network stitches 106) may transmit data packets to the analysis and modeling system 114. The edge elements 202a and/or 202b receive the data packets from the network fabric and may store the data packets (or a portion thereof) in the data storage system 204. In some examples, the edge elements load balance data packets received by the analysis and modeling system 114. For example, the edge elements 202a-b may load balance data packets between the memory elements 206a-n. In a particular example, the edge element 202a is an ingress edge element operable to receive any data packets transmitted to the analysis and modeling system 114 (e.g., to ingest the packets) and the edge element 202a is an egress edge element operable to transmit any data packets transmitted from the analysis and modeling system 114. The data packets are stored with an association to a timestamp. In operation, the timestamps are utilized by the analysis and processing system 114 to determined relative timing of a business processes (and portions therefore) and other information such as overall duration of time required to complete a business process (e.g., in units of days, hours, minutes, and/or second). Since the timestamps are used to determined relative timing of a business processes and portions therefore, a key aspect of assignment the timestamps is that they are applied using a consistent approach across all data packets analyzed by the system 114. The specific approach to assigning a timestamp to each data packet is flexible and can be implemented in a number of ways without departing from the scope of the present disclosure. For example, the timestamp may retrieved directly from a payload of the data packets, assigned by the network switches (e.g., based on a time at which the packet was received by the switch), and/or assigned by a component of the analysis and modeling system (e.g., based on a time at which the packet was received by the component). Again, as long as the application of timestamps is consistent through the system 114, substantial flexibility is provided with respect to the specific implementation. The data packets and the corresponding timestamps are stored in the data storage system 204. In some examples, the packets may be stored in a data store without further processing (e.g., store the packets and timestamps). In other examples, the packets may be aggregated into flows (e.g., preserving the order of communications between a series of network elements) before storing (i.e., and stored as a dataflow).

The processing element 208 comprises (among other things) one or more processors. The processing element analyzes data (e.g., by executing Big Data analysis algorithms, machine learning algorithms, and/or other techniques on data in the data storage system 204) to provide information regarding a business process and/or nodes involved in executing the business process. For example, the processing element 208 may implement algorithms or computational approaches including (but not limited to), e.g., Naive Bayes, AdaBoost, Linear regression, k-Nearest Neighbors, Support Vector Machines, PageRank, Apriori, FP-trees, Singular Value Decomposition, Classification and Regression Trees (CART), Platt SMO, Classification with logical regression, Tree-Based Regression, and/or k-Means Clustering. In one example, the processing element 208 generates a model of a business process by executing one such algorithm on data extracted from data packets in data store 204. The processing element 208 can store the model of the business process in the model data store 210. The model data store 210 may store one or more business process models 212. The analysis and modeling system can both generate models of business processes and analyze the models of business processes. In some examples, the nodes and/or the network fabric may store and/or analyze (or otherwise process) portions of the data. Such storage and/or analysis by the nodes and/or the network fabric may be in addition to or in place of that performed by the analysis and modeling system 114.

The processing element 208 may retrieve data packets from the data storage system 204 and correlate a host address (e.g., identified as a source field or a destination field of in a data packet) to an individual component (such as a user profile or application servers) and/or specific end points (e.g., which, in turn, may correspond to a business function). In addition, the processing element can daisy chain data from individual data packets (or flows) to generate models of business processes on a per transaction basis (e.g., where a transaction is an individual instance of a business process model). For example, the processing element can compare a first payload of a data packet to a second payload of another data packet to determine whether the first and second payloads contain data that correspond to a same transaction. Each transaction is analyzed (e.g., by the processing element 208) by, e.g., comparing it to other transactions to identify anomalies, failures, delays, and other characteristics. Such analysis can be used to determine a source of a problem related to a business process (e.g., delays where the source may be an IT resource (such as a network, server, application processing, etc.), user activity, or a combination thereof). Once the business processes are modeled based on data identified in the network fabric, new business processes models can be developed (e.g., by modifying existing business processes based on a previously identified problem) to improve both the network and business model efficiencies. Ultimately, the new business processes models can be simulated to produce new data sets for analysis in the system to compare relative efficiency.

The visualization element 214 may include a processor (and/or algorithms) for generating a visual representation of data utilized by the analysis and modeling system 114. For example, the visualization element 214 may generate graphical representations (e.g., for transmission to endpoints and/or for display on a screen) of the data in the data store 204, the business process models 212, and/or the topology of the network fabric.

An exemplary application of the analysis and modeling system 114 includes utilizing the system to model a business process, where the business process includes receipt of an order for a product, processing the order, and shipping the product. By tracing data packets related to the order through the network fabric, the system 114 may retrieve information from the packets (e.g., information corresponding to a flow of approvals, inventory picking). The system 114 can analyze, using this information, nodes involved in executing the business process can be analyzed. The network fabric may transmit data packets to the analysis and modeling system 114. The data packets may be identified based on having a source or a destination identifier that matches one in a list maintained by the analysis and modeling system 114. Each data packet may be inspected by the processing element 208 to extract a payload of the data packet. The processing element 208 may determine that a first payload of a first data packet corresponds to the second payload of a second data packet. By correlating data in the payloads across a plurality of data packets, the processing element may identify relationships between data packets.

In some examples, the processing element 208 may analyze, using a machine learning algorithm, the plurality of data packets, wherein the machine learning algorithm generates an output identifying a transaction corresponding to a portion of a business process. In such an example, two packets may be identified as related to a single transaction (e.g., in this case, a single order) based on both including a same identifier related to the transaction (e.g., order number, customer number, and/or similar a timestamps). When it is determined that two (or more) data packets relate to a same transaction, the data packets may be linked to one another in a daisy chain (e.g., a linear series of data packets). Each data packet in a linked pair of data packets may, in turn, be linked to a different data packet (or another linked pair of data packets) based on a determination that the data packet and the different data packet relate to the same transaction. Thus, a single data packet may be linked to a plurality of data packets based on different portions of the payload of the packet. For example, a plurality of data packets (e.g., stored in data storage 204) may include a first data packet, a second data packet, and a third data packet. Each data packet may be stored with a corresponding timestamp. The first data packet may include a first payload comprising an order number (e.g., 506-101) and a customer number (e.g., 506).

The second data packet may include a second payload comprising the order number (e.g., 506-101), a part number (e.g., XYX-46), and a number of parts (e.g., 10). The third data packet may include a third payload comprising the part number (e.g., XYX-46) and the number of parts (e.g., 10). In this case, the processing element 208 may determine that the first payload corresponds to the second payload, e.g., based on both payloads containing the same order number (e.g., 506-101). The processing element 208 links the first data packet to the second data packet based on the determination (e.g., by generating an information model of a linked pair of packets). In addition, the processing element 208 may determine that the second payload corresponds to the third payload, e.g., based on both payloads containing the same part number (e.g., XYX-46), the same number of parts (e.g., 10) and similar timestamps (e.g., where similarity is determined based on comparing a difference between the timestamps to a threshold time value). The processing element 208 links the second data packet to the third data packet based on the determination and, thereby, links the third data packet to the existing linked pair (i.e., between the first and second data packets). Thus, the second data packet is contains is linked to the first and the third data packets based on different portions of the payload of the second data packet. Similar operations can be used to link any number of data packets until a complete transaction is modeled.

The processing element may generate an information model for a transaction based on a linear series of data packets (e.g., daisy chained as described above). The information model may be generated based, at least in part, on linked pairs of data packets. For example, each data packet in a linked pair may be modeled as a step in a business process. The steps may be daisy chained together based on relationships between the data packets. A relationship (or correspondence) between the data packets indicates a directional flow in a business process. For example, the first data packet may be modeled as first step in the transaction. The second data packet may be modeled as a second step in the transaction. Third data packet may be modeled as a third step in the transaction. The relationship between the first and second packet may be modeled as a logical flow (e.g., an arrow) from the first step to the second step based on the order detected (e.g., based on timestamps) between the first and second data packets. The relationship between the second and the third packet may be modeled as a logical flow (e.g., an arrow) from the second step to the third step based on the order detected (e.g., based on timestamps) between the second and third data packets.

Figure 3:
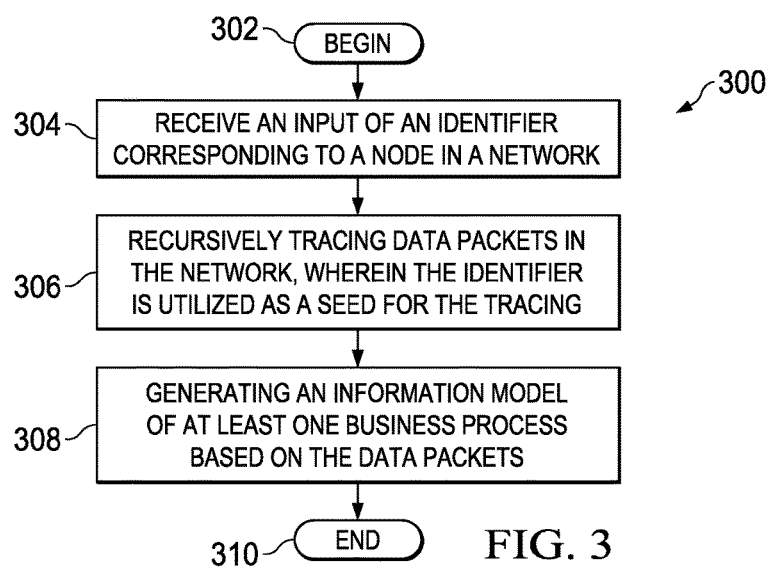
FIGS. 3 and 4 illustrate exemplary logic (or methods) for modeling business processes in accordance with some embodiments of the present disclosure.

FIG. 3 is simplified diagram illustrating logic (logic 300) for modeling business processes in accordance with some embodiments of the present disclosure. This logic may be utilized to discover, based on an identifier, a previously unidentified business process. Logic 300 may be implemented in any component or combination of components of system 100. For example, a processor operatively coupled to (or within) the network controller 102 may execute logic 300. In some implementations, logic 300 may be provisioned in whole or in part in any one or more network switches 106a-h. In further implementations, logic 300 may be implemented in any component or combination of components of system 200. For example, logic 300 may be provisioned in whole or in part in processing element 208 (FIG. 2).

Logic 300 begins at 302, which may coincide with a start/end point of other logic, routines, and/or applications. Logic 300 advances from 302 to 304. At 304, input of an identifier corresponding to a node in a network is received. The identifier may be any number that uniquely identifies the node in the network (e.g., MAC address, an IP address, a port number, a host name, and the like). The input of the identifier may be received from a user input device (e.g., a selection from a mouse, an alphanumeric string of characters from a keyboard, a selection from a touchscreen, and the like). In other examples, the input is received from a network element (e.g., a server, a router, a switch, and the like). When the input is received, the input may be transmitted to from the receiving component to other components. For example, the analysis and modeling system 114 (of FIGS. 1 and/or 2) may receive (e.g., from an endpoint) an input of a MAC address of a node in the network 104. The analysis and modeling system 114 may generate a list of identifiers (e.g., instantiate an empty list object) and add the MAC address to the list. In some examples, the list is stored in a memory element accessible by the analysis and modeling system 114.

At 306, data packets in the network are recursively traced. The identifier is utilized as a seed for the tracing. The seed (which is an identifier) is the beginning of a list of identifiers that grows based on the tracing. Additional identifiers are added to the list of identifiers (i.e., the list grows) by determining additional data packets that include (i.e., in a field of the packet) any identifier currently in the list. The additional data packets are inspected to determine (e.g., in other fields of the packet) other identifiers for adding to the list (e.g., identifiers that are not already on the list). For example, an analysis and modeling system may transmit the identifier to a network controller of a network. The network controller may utilize the identifier to identify data packets in the network. For example, the network controller may program one or more network switches and/or network routers to filter any data packets that include the identifier (e.g., in a source field and/or destination field). In some examples, the programming by the network controller may include updating firmware, routing tables, or any other data or instruction utilized by the network switches and/or the network routers in transmitting packets through the network. The network switches and/or the network routers may filter the packets by copying the packets and/or redirecting the packets (or copies thereof) to a new destination (e.g., where the network controller the new destination in instructions used to program the switches and/or routers). For example, the network switches and/or the network routers may transmit copies of the packets to the analysis and modeling system. Since the packets are known to include the identifier in at least one of the fields of the packet, the other fields are inspected for identifiers of other nodes. For example, a source field of a packet may include the identifier. In such a case, the destination field may be inspected to determine a new identifier. In other examples, a destination field of a packet may include the identifier. In this case, the source field may be inspected to determine the new identifier. The new identifier is added to the list of identifiers to generate an updated list of identifiers. Thus, the addition of the new identifier corresponds to receiving an update to the list of identifiers used for the recursively tracing data packets in the network. In turn, the updated list of identifiers is used as the basis for continuing a cycle of identifying packets associated with the identifiers and using the packets to determine further identifiers. The network controller can reprogram, in real-time with respect to the receipt of the update, the network switches and/or the network routers based on any updates to the list of identifiers (regardless of the source of the update). Thus, in addition to updates from recursively tracing packets, a network operator may update the list of identifiers and such an update can be prorogated, in real-time (or near real-time), to the network elements by the network controller.

The aforementioned operations (e.g., filtering packets based on the list, identifying new identifiers in fields of the packets, adding the new identifiers to the list) can be recursively executed to trace packets between nodes and generate models based on the packets.

At 308, an information model of at least one business process is generated based on the data packets (and/or daisy-chains of data packets). For example, a processing element may analyze the data packets using a machine learning algorithm. The processing element may utilize the output of the machine learning algorithm (or other results of an analysis of the packets) to generate the information model of at least one business process. The information model may be based on an object-oriented framework for modeling business processes. For example, the information model may include a set of classes, interfaces, and data structures that can be utilized to model a business process. In other examples, the information model may be inclusive of one or more files formatted in a markup language (e.g., Extensible Markup Language (XML), Hypertext Markup Language (HTML), Extensible HTML (XHTML), etc.). The information model may be generated based on relationships between the data packets (e.g., where the relationships are identified in daisy-chains of data packets). The data packets may be aggregated into flows (e.g., preserving the order of communications between a series of nodes). In such examples, payloads associated with data packets in the flows are collected with timestamps and source/destination information. The payloads can be processed using machine learning algorithms to identify relationships between individual nodes (or data packets in transmit between the nodes).

In one example, a classification algorithm is executed on a set of network flows. An output of the classification algorithm is pairs of data packets (or pairs network flows) that are related to one another (e.g., in daisy chains comprising one or more linear series of data packets as described above). For example, a first data packet may include (e.g., in a payload of the packet) a customer number, a part number, and a timestamp and a second data packet may include the customer number, a second timestamp, and an order number. In this example, the first packet may be from an email received by an email server (e.g., from customer requesting a part), while the second packet may be from an order received at an order management system. The classification algorithm may pair the first data packet and the second data packet based on both including the same customer number and having timestamps similar to one another (e.g., a difference between the timestamps is less than or equal to a threshold value). A single data packet may be linked to a plurality of data packets based on different portions of the payload of the packet, as described above. Similar operations can be used to link any number of data packets until a complete instance of a business process (i.e., a transaction) is modeled. The information model for such a business process may be generated based on the pairs of data packets. For example, each data packet may be modeled as a step in a business process. A relationship (or correspondence) between the data packets indicates a directional flow in a business process. For example, the first data packet may be modeled as an object corresponding to receiving an email from customer (e.g., may include a identifier of the device involved and/or the type of device such as an email server, an application server, a personal computer, a telephone, and the like). The second data packet may be modeled as an object corresponding to entering an order. The relationship between the two steps may be modeled as a logical flow (e.g., an arrow) from the first step to the second step based on the order detected (e.g., based on timestamps) between the first and second data packets.

A similar process can be repeated to generate models corresponding to additional data packets and to model relationships between such packets (and relationships to the first and/or second packets). Such a model of a particular network flow corresponds to an instance of an unknown business process (i.e., a transaction). For example, an analysis and modeling system may have no prior knowledge of the business process being modeled. Moreover, even if other network flows correspond to other instances of the same business process, further analysis of the models may be required to identify such a relationship. For example, the above example may correspond to an instance of business process for fulfilling an order from a customer. The analysis and modeling system may detect other instances of the business process for fulfilling an order from a different customer, or different employee of the business may receive the order.

In some examples, an analysis and modeling system analyses all instances of (unknown) business processes to identify similarities between the instances and/or processes. Such similarities may indicate that a common business process is being performed between instances. Classification algorithms or clustering algorithms may be executed on a set of instances (e.g., wherein all of such instances correspond to unknown business processes). A result of the analysis may be groups of individual instances (e.g., where each group corresponds to a business process, and each instance is corresponds to an instance of the business process). In a specific example, all features (e.g., steps, or transaction between network elements) that are shared between the instances of a particular group are utilized to generate an information model of the business process (e.g. such that there is a parent-child relationship between the instances and the information model of the business process). Thus, the information model of the business process can be a generalization of features that are common among the instances of the clustered group (e.g., by including, in the model, features that are shared by all, a majority, or some of the instances of the group).

In further examples, a visualization system (e.g., such as 214 in FIG. 2) may generate a graphical output of one or more of the informational models of business processes. Graphical output may be rendered in a graphical user interface (GUI). In some cases, such a GUI may be used to receive input to verify a business process. The verification may include receiving input; the input specifies that a particular information model is an accurate model of business processes (e.g., verification that the model is an archetypal representation of the business process). Allowing the receipt of verification through the GUI enables, for example, business operators and/or network administrators to provide input confirming the accuracy (and desirability) of business processes discovered using the approaches defined herein. When an information model of a business process is verified (or labeled as a positive example of a business process), the information model (and/or the instances clustered in the group used to generate the information model) can be labeled (or classified) and used as a training data set for further identifying other instance of the business process in subsequent network traffic (e.g., using supervised learning algorithms). Logic 300 ends at 310, which may coincide with a start/end point of other logic, routines, and/or applications.

The recursive analysis exemplified by logic 300 may, advantageously, use only a single node as a starting point for identifying and analyzing a business process in the network. The recursive operations are utilized to discover relationships between nodes based on data transmitted between the nodes. In addition, such a recursive approach efficiently focuses resources on analyzing data packets only for nodes that are actively involved in a communication processes (e.g., and, therefore, more likely to be involved in a executing business process). For example, any node that does not communicate in a chain of communications either directly or indirectly related to the seed identifier is excluded from the analysis (e.g., since it will not be discovered in the source/destination field of a data packet).

Figure 4:
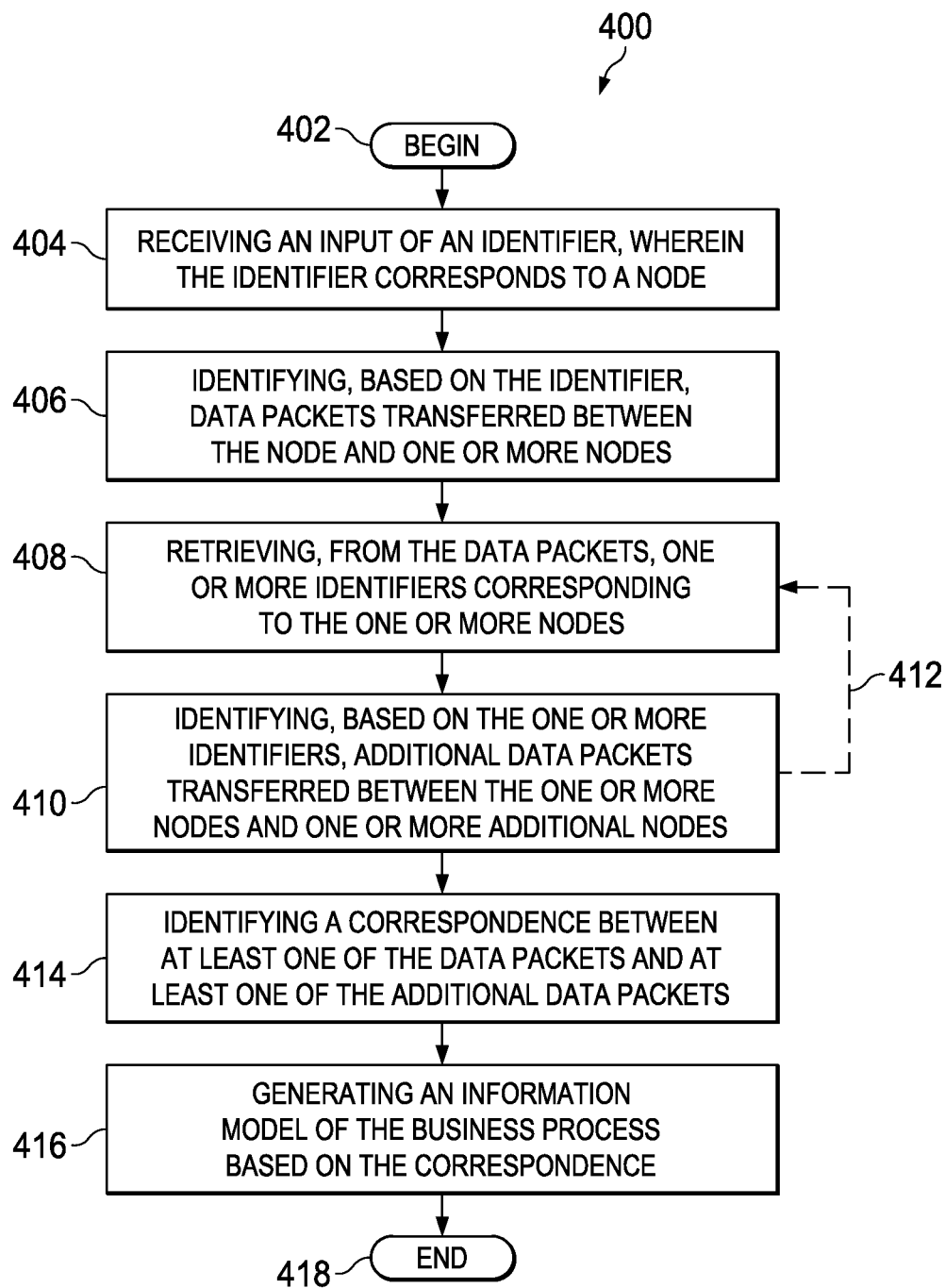

FIG. 4 is simplified diagram illustrating further logic (logic 400) for modeling business processes in accordance with some embodiments of the present disclosure. Logic 400 implements the operations of logic 300 according to some embodiments of the present disclosure. Logic 400 begins at 402, which may coincide with a start/end point of other logic, routines, and/or applications. Logic 400 advances from 402 to 404. At 404, an input of an identifier is received. The identifier corresponds to a node. For example, the identifier may be any identifier that can be used to identify the node and/or identify data traffic in transit to/from the node over a network. In some examples, the identifier is utilized as a seed for tracing packets in the network. For example, the identifier may be added to a list of identifiers used for recursively tracing data packets associated with any identifiers in the list of identifiers. 404 may include operations similar to those described with respect to 304 (FIG. 3); such operations are not repeated here only for the purpose of brevity.

At 406, data packets are identified (e.g., by an analysis and modeling system) based on the identifier. The data packets are identified in the network fabric during transmission between the node and one or more nodes. Network elements such as routers and/or switches facilitate the transmission of data packets between nodes in the network (e.g., based on identifiers in a source field and/or a destination field of the data packets). Thus, such network elements determine, during the transmission, whether any packets include the identifier. For example, when a network element receives a packet that is in transit to a destination, the network element may compare a source field and/or a destination field of the data packet to the identifier. When it is determined that the source field and/or the destination field match (and/or correspond to) the identifier, then the network element may determine that the packets are being transmitted between the node (i.e., which corresponds to the identifier) and one or more nodes. When such a determination is made, the network element may further process the packets (e.g., copy and/or retrieve data from the packets).

At 408, one or more identifiers are retrieved from the data packets. The one or more identifiers correspond to the one or more nodes. Since the packets have already been determined to be associated with the identifier (i.e., either in transit to or from the node corresponding to the identifier), the network element may determine other nodes (i.e., the one or more nodes) that are associated with the packet. For example, if the packet has a source field that matches the identifier, then an identifier of the destination may be retrieved from the destination field of the data packet (e.g., and added to the list of identifiers). Similarly, if the packet has a destination field that matches the identifier, then an identifier of the source may be retrieved from the source field of the data packet (e.g., and added to the list of identifiers). The identifiers of known nodes (e.g., nodes identified in the list of identifiers) are utilized to discover (based on data packets) the one or more nodes that are communicating with the known nodes.

At 410, additional data packets are identified (e.g., by an analysis and modeling system) based on the one or more identifiers. The additional data packets are identified in the network fabric during transmission between the one or more nodes and one or more additional nodes. Network elements determine whether any packets being transmitted include the one or more identifiers (e.g., similar to the operations described with respect to 406). Any packets that are determined to include the one or more identifiers may be further inspected (e.g., at 412) to retrieve further identifiers of nodes that are communicating with the one or more nodes.

At 412, operations corresponding to 408 and 410 may be recursively executed (e.g., by an analysis and modeling system) on a growing list of identifiers. Each execution of the operations may determine, from data packets retrieved from the network fabric, identifiers for adding to the list. Thus, the logic recursively traces data packets to and/or from a particular node (or set of nodes) and further identifies other nodes that are communicating with the particular node based on the data packets. At each iteration of the loop, the data packets (or a portion thereof) may be copied to a data store (e.g., data store 204).

It is noted that 406, 408, 410, and the loop 412 (FIG. 4) are an example of operations that may be performed in connection with 306 (FIG. 3).

At 414, a correspondence between at least one of the data packets and at least one of the additional data packets is identified (e.g., by an analysis and modeling system 114). The data packets may be retrieved from the data store. In some examples, a first payload of first data packet is compared to a second payload of a second data packet (e.g., by a processing element in the analysis and modeling system 114). Each data packet may be modeled as a step in a business process. The correspondence between the data packets indicates a directional flow in a business process. When it is determined that the first payload includes data that matches (or otherwise corresponds to) data in the second payload, a correspondence between the first data packet and the second data packet may be stored in a memory element. The correspondence may be stored as an entry in a database that includes identifiers corresponding to the first the second data packets (respectively) and a record of the relationship between the packets (e.g., a common value such as a customer number, an order number, and the like). In further examples, each data packet may be modeled as a step in a business process. The correspondence between the data packets indicates a directional flow in a business process and may be modeled as a logical flow (e.g., an arrow) between the steps based on the order detected (e.g., based on timestamps) between the data packets.

At 416, an information model of a business process is generated (e.g., by an analysis and modeling system) based on the correspondence. The information model may be generated utilizing machine-learning algorithms that operate directly on be data packets and/or the database entries including the correspondence between data packets. In some examples, the individual data packets are daisy chained into an instance of a business mode using not only the correspondence between data packets but also the timestamps, which provide a temporal relationship between data packets. 416 may include operations similar to those described with respect to 308 (FIG. 3); such operations are not repeated here only for the purpose of brevity. Once a model is developed of a particular business process, the network fabric may measure a normal and acceptable range of process timeframes for each step in the particular business process. Deviations may be flagged for automated or human intervention (e.g., providing or removing IT systems like servers in a cluster, or escalating alerts to prompt human intervention). It is noted that 414 and 416 (FIG. 4) are an example of operations that may be performed in connection with 308 (FIG. 3).

Figure 5A:
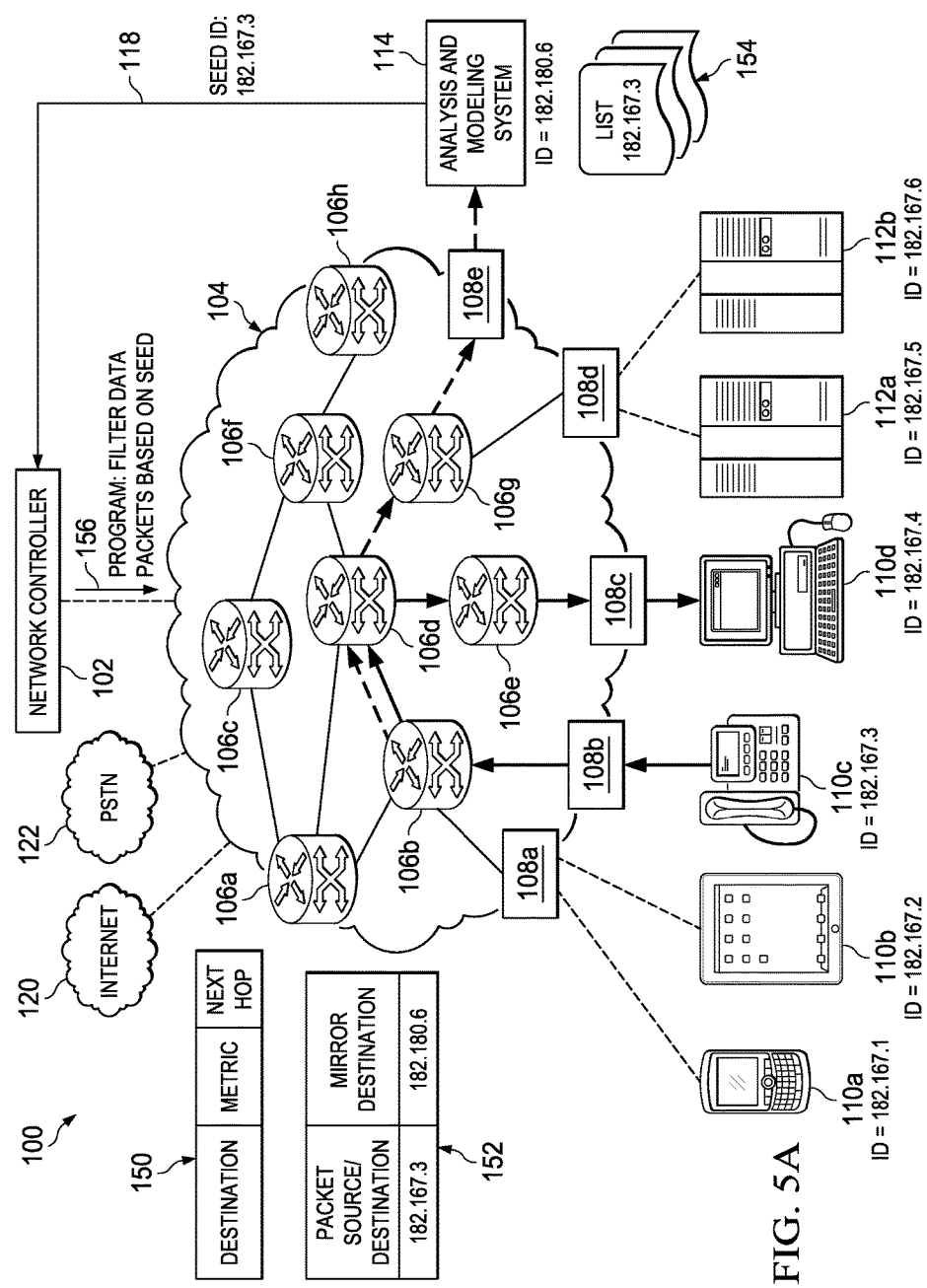
FIGS. 5A, 5B, and 5C illustrate an example of an analysis and modeling system generating a model of a business process based on communications with a network controller and a network fabric.
Figure 5B:
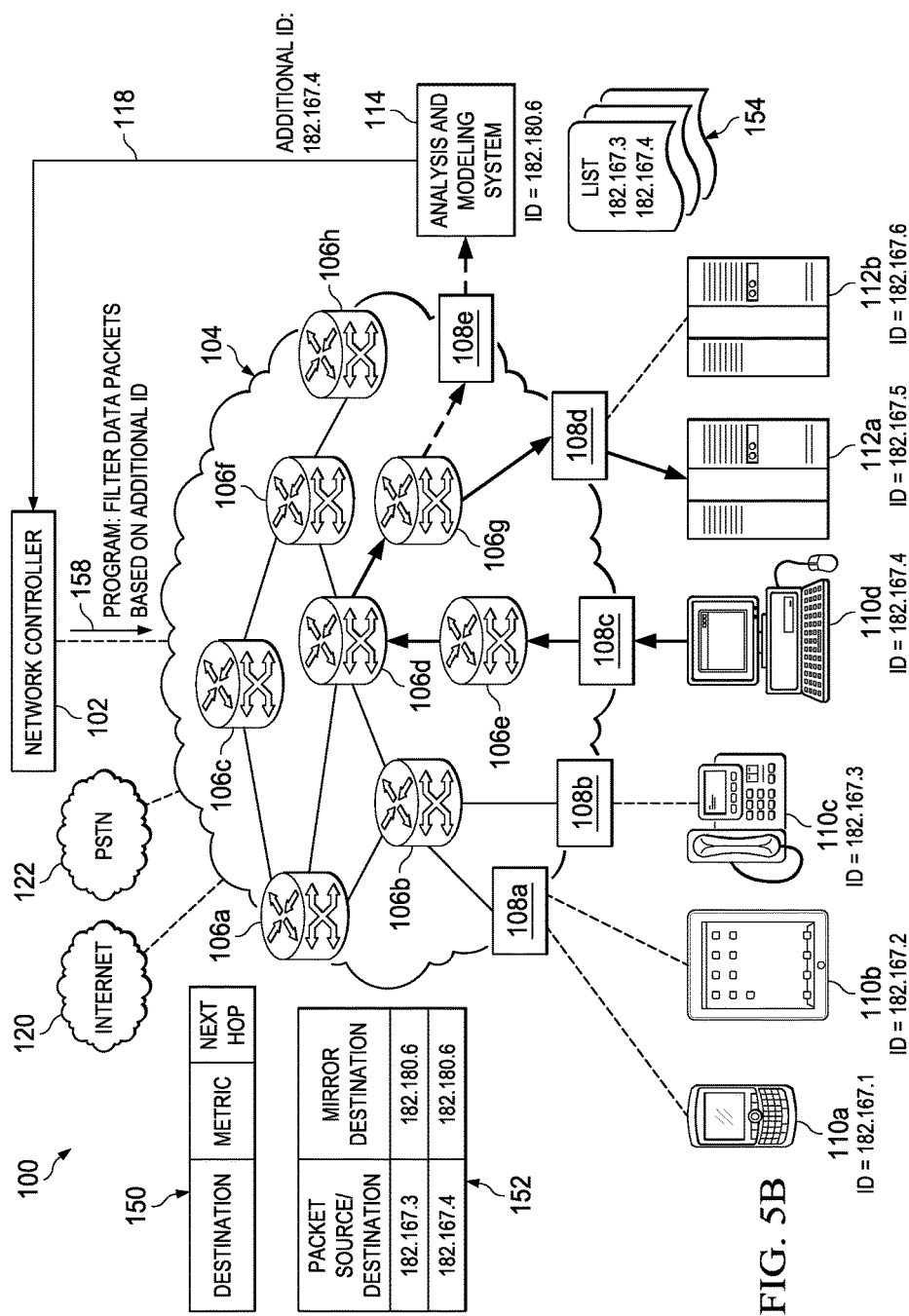
Figure 5C:
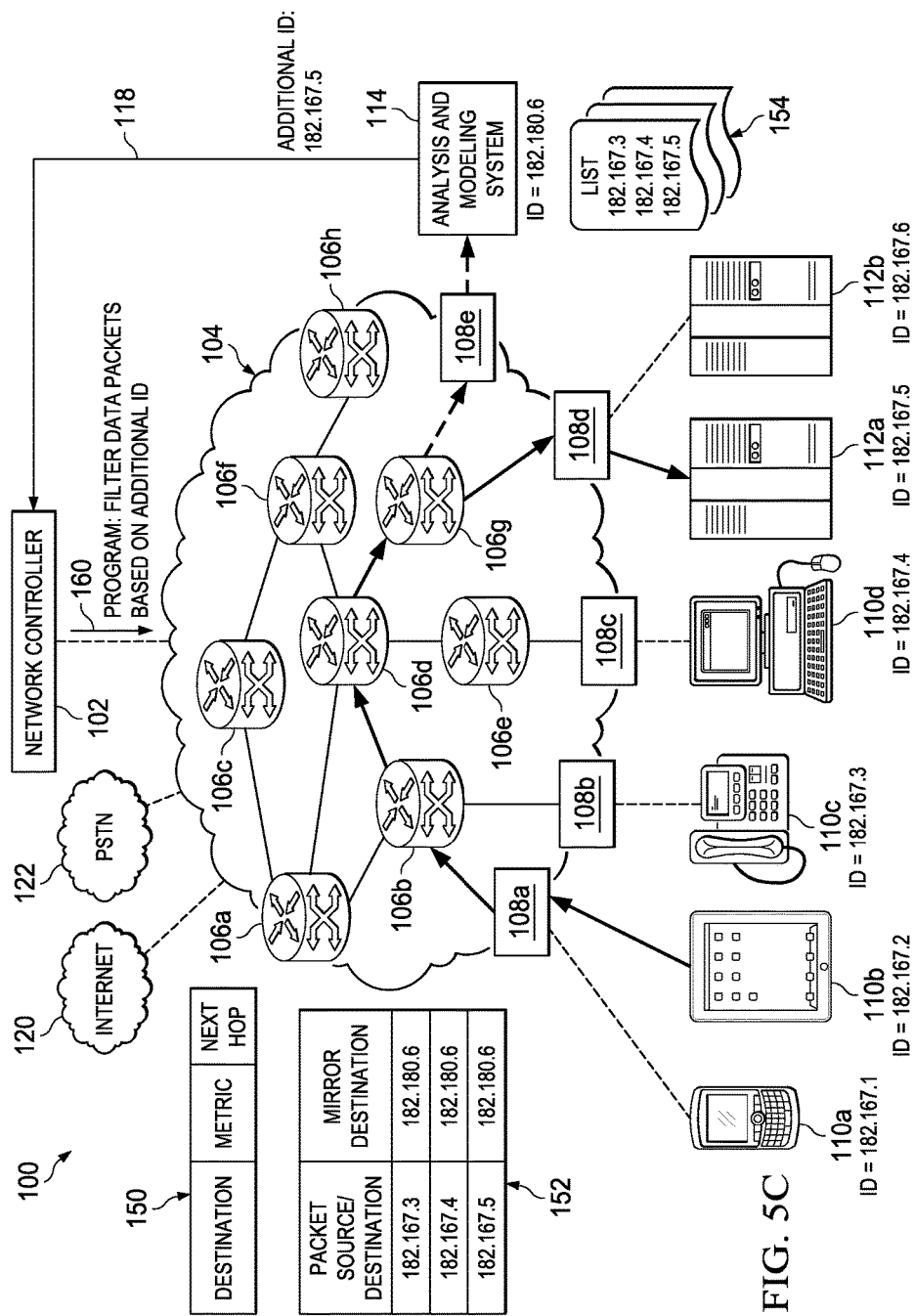

FIGS. 5A, 5B, and 5C illustrate an example of an analysis and modeling system generating a model of a business process based on communications with a network controller and network elements of a network fabric. This example begins with the system and state illustrated in FIG. 5A, advances to the state illustrated in FIG. 5B, and, finally, advances to the state illustrated in FIG. 5C. Thus, these three Figures, when viewed in the order {5A, 5B, 5C} illustrate an exemplary recursive operation of the analysis and modeling system in tracing packets through the network 104. The components of system 100 in FIGS. 5A, 5B, and 5C are similar to those in system 100 in FIG. 1 and are not described again here only for the purpose of brevity. Compared to FIG. 1, FIGS. 5A, 5B, and 5C additionally illustrate, among other things: identifiers for several nodes (i.e., labeled "ID" in the Figures), communications between some nodes (i.e., as generally indicated by solid and dashed lines in the Figures), data tables associated with the network fabric (i.e., tables 150 and 152), and a list of identifiers (i.e., 154).

Each node in the system has a corresponding identifier. The identifier may be any identifier that can be used to identify the node and/or identify data traffic in transit to the node over a network. In this example, the identifiers are IP addresses for each node: endpoint 110a has an identifier of 182.167.1; endpoint 110b has an identifier of 182.167.2; endpoint 110c has an identifier of 182.167.3; endpoint 110d has an identifier of 182.167.4; server 112a has an identifier of 182.167.5; server 112b has an identifier of 182.167.6; and the analysis and modeling system 114 has an identifier of 182.180.6.

In the example of FIGS. 5A-5C, any of the components of system 100 may execute (in whole or in part) the logic 300 and/or logic 400. In a particular example, the analysis and modeling system 114 executes the logic 300 and/or logic 400 to perform the operations as described below with respect to the example of FIGS. 5A-5C.

Turning to FIG. 5A, the analysis and modeling system 114 receives an input of an identifier corresponding to a node in the communication system 100 (e.g., in a manner similar to that described with respect to 304 (FIG. 3) and/or 404 (FIG. 4)). The system 114 receives an input of an identifier 182.167.3, which corresponds to endpoint 110c. The identifier 182.167.3 is a seed for recursively tracing packets. In this example, only a single identifier is input as the seed for recursively tracing packets. In other examples, the seed may comprise a plurality of identifiers. The input may be received from a graphical user interface (e.g., input by a network administrator or a business operator), a third-party system, or other hardware containing the identifier. When the system 114 receives the identifier, the system stores the identifier in the list of identifiers 154. In the example of FIG. 5A, the list 154 contains only a single identifier (which was received as the input). The identifier is utilized as a seed for recursively tracing data packets in the network. Using the seed, the system 114 can discover (e.g., by inspecting data packets) other nodes that communicate with the endpoint 110c (which is the node corresponding to the identifier).

The system 114 transmits the seed to the network controller 102 over the communication channel 118. When the network controller 102 receives the seed, the network controller generates an instruction 156 to filter data packets associated with the seed identifier. The network controller transmits the instruction 156 to one or more network elements. Using the instruction, the network controller programs the one or more network elements to generate a copy of each of the data packets and transmit, to one or more servers, the copy of each of the data packets. The programming of the one or more network elements may comprise: an instruction to direct the copy of each of the data packets to the one or more servers, an instruction to mirror a port on which the packets are received to a remote destination (e.g., by copying incoming packets and transmitting them to the destination), and/or an instruction to generate a timestamp corresponding to each of the data packets (e.g., using a time at which the packets was received by the network element, or any other time related to receipt or transmission of the packets). In some examples, port mirroring and/or access control lists may be used generate and transmit copies of the data packets from a receiving network element to an edge element in the modeling and analysis system 114. Thus, the network fabric replicates traffic of interest (e.g., traffic having a source or destination matching an identifier in a list of identifiers) and forwards the traffic to the modeling and analysis system 114 for analysis (e.g., using APACHE SPARK). The network controller may instruct the one or more network elements on behalf of the analysis and modeling system 114. For example, the analysis and modeling system 114 may transmit instructions to the network controller regarding which identifiers to filter. In turn, the network controller programs the one or more network elements to generate copies of data packets associated with the identifiers to filter.

The one or more network elements (e.g., any of network elements 106a-h) receive an instruction from the network controller 102. Each network element may execute the instruction and/or may add the instruction to an existing instruction set stored local to the network element. Each network element may update a routing table (e.g., 150) and/or a port mirroring setting based on the instruction (e.g., port mirroring table 152). In this example, a network element may update its port mirroring table 152 to include the seed identifier (i.e., 182.167.3) and identifier for a destination (i.e., 182.180.56, which corresponds to the system 114) of the port mirroring (e.g., based on receiving the instruction 156 from the network controller 102). The routing table 150 and the port mirroring table 152 are illustrative examples of those that may be implemented by any one or more of the network elements 106a-h. It will be apparent to those of skill in the art that each of network elements 106a-h may have different tables stored therein that may be updated using a routing protocol (e.g., the control plane).

Because the network elements including instructions to filter data packets associated with the seed identifier, any data packet associated with the seed identifier is copied to the analysis system 114. In this example, port mirroring is used to identify any packets that have either a destination field or a source field containing the IP address 182.167.3 (i.e., any packets to or from endpoint 110c) and to transmit those packets to the IP address 182.180.6 (i.e., the analysis and modeling system 114). The solid arrows between 110c, 108b, 106b, 106d, 106e, 108c, and 110d correspond to a network flow between endpoint 110c and the endpoint 110d.

In this example, the endpoint 110c generates the network flow by initiating a VoIP call to the endpoint 110d. When endpoint 110c generates the network flow to the endpoint 110d, at least one of the network elements involved in transmitting the network flow detects that the packets in the network flow are associated with the seed (e.g., due to the packets having a source field that contains 182.167.3). For example, the network element 106b determines that the packets in the network flow have a source field that matches an identifier in the port-forwarding table 152 (i.e., a source field of the packets includes the identifier 182.167.3). When the network element 106b makes the determination, it generates a copy of each of the data packets in the network flow and a timestamp identifying a time at which it received each of the data packets. The network element 106b transmits the copy of each of the data packets and the corresponding timestamps to the destination 182.180.6 (i.e., the analysis and modeling system 114) based on the port mirroring table 152. The dashed arrows between 106b, 106d, 106g, 108e, and 114, correspond to the copy of each of the data packets and the corresponding timestamps.

The analysis and modeling system 114 receives the copy of each of the data packets and the corresponding timestamps from the network element. The data packets were identified based on the (seed) identifier. The analysis and modeling system 114 retrieves one or more identifiers from the data packets (e.g., in a manner similar to that described with respect to 408 (FIG. 4)). For example, various fields of the data packet may be compared against identifiers in the list of identifiers 154. If a field contains a new identifier (i.e., one that is not in the list of identifiers), then the new identifier is added to the list of identifiers. In this case, at least one of the data packets has a source field that includes the seed identifier and a destination field that includes the IP address 182.167.4 (which is an new identifier corresponding to endpoint 110d). The system 114 retrieves the new identifier from the at least one of the data packets. The new identifier is added to the list of identifiers 154 (e.g., as is illustrated in FIG. 5B). The analysis and modeling system 114 recursively traces data packets in the network. Thus, the identifiers in the updated list of identifiers 154 are used to identify further data packets, which are then used to determine other identifiers for inclusion in the list of identifiers 154.

Turning to FIG. 5B, the analysis of modeling system 114 updates the list of identifiers 154 to include the one or more identifiers retrieved that were identified in a first iteration (i.e., FIG. 5A) of identifying packets and retrieving identifiers (e.g., in a manner similar to that described with respect to loop 412 in FIG. 4). In this example, the IP address 182.167.4 is an addition identifier, which has been added to list of identifiers 154. The addition identifier (i.e., 182.167.4) is transmitted to the network controller 102 over the communication channel 118. The network controller programs the network elements of the network 104 to filter data packets that are associated with the additional identifier (e.g., using a process similar to that described with respect to FIG. 5A). An instruction 158 is transmitted to the network elements. The instruction may include an address of a destination to which the traffic is to be copied. In this case, IP address 182.180.6 (which corresponds to the analysis and modeling system 114) is the destination to which the traffic is to be copied. The instruction is used by the network elements to add the additional identifier to the port mirroring table 152. The solid arrows between 110d, 108c, 106e, 106d, 106g, 108d, and 112a correspond to a network flow between endpoint 110d and the network element 112a. In this example, endpoint 110d generates the network flow to network element 112a by transmitting an order to an order fulfillment system stored on the network element 112a. For example, the endpoint 110d may receive input of an order (e.g., from a user input device) and transmit the input to the order fulfillment system. The network elements use the port mirroring table to identify, copy, and transmit packets and to the analysis and modeling system 114. In this example, the network element 106g generates a copy of each of the data packets (i.e. packets associated with the additional identifier) and the corresponding timestamps. The network element 106g transmits, based on the updated port mirroring table 152, the copy of each of the data packets and the corresponding timestamps to the destination 182.180.6 (i.e., the analysis and modeling system 114). The dashed arrows between 106g, 108e, and 114 correspond to the copy of each of the data packets and the corresponding timestamps. Again, the system 114 stores/retrieves addition identifiers from the data packets. In this case, at least one of the data packets has a source field that includes the IP address 182.167.4 (which corresponds to endpoint 110d) and a destination field that includes the IP address 182.167.4 (which corresponds to endpoint 112a). The system 114 may inspect each field of the data packet and compared each to identifiers in the list of identifiers 154. Since the source field includes an identifier (i.e., IP address 182.167.4) that is already in the list 154, the address is not added to the list. However, it is determined that the destination field contains a new identifier (i.e., IP address 182.167.5) that is not already in the list 154, the list 154 is updated to include the new identifier. The updated list of identifiers 154 is illustrated in FIG. 5C. The updated list of identifiers 154 is used to recursively tracing packets in a manner similar to that described for FIG. 5A.

In FIG. 5C, the packets have a destination field that includes the IP address 182.167.5 (corresponding to network element 112a). The one or more identifiers (retrieved from the data packets) are added to the list of identifiers 154 (as is illustrated in FIG. 5C). Again, because the analysis and modeling system 114 recursively traces data packets in the network, the identifiers in the updated list of identifiers 154 are used to identify further data packets, which are then used to determine other identifier for inclusion in the list of identifiers 154. This process may continue indefinitely, may stop at a threshold set by a network administrator (e.g. a maximum number of identifiers in the list), and/or may stop when one or more of the network elements involved in copying, transmitting, or analyzing the packets reaches its processing capacity (and/or may indicate such an event to the system 114).

In some examples, the list of identifiers 154 may be modified to control the amount of traffic received by or transmitted from any network element (or node). The network controller may load balance the effort required to copy packets in the list of identifiers (e.g., by assigning specific subsets of the network elements a task of copying packets associated with individual identifiers in the list). The network controller may utilize the control plane to identify the topology of nodes (e.g., physical and/or logical location and connectivity between the nodes) in the communication system 100 and determine the best route for the packets to reduce the risk that any single switch is overwhelmed by a volume of traffic (e.g. as a result of copying data packets). In addition, the control plane may be used to signal an operator or separate logical control, when additional nodes need to be added to the system 114 to handle the load of client/server side packets. In the event that the volume of traffic is larger than can be collected and/or processed by the system 114, the system 114 may use analytical techniques to start from a seed node (based on an identifier of the node) and then instruct the control plane to add relevant additional nodes based upon observed communications between the seed node and other nodes in near real time. The system 114 may report its current utilization to the network controller 102 via communication channel 118. In other examples, the system 114 may instruct the network controller to remove and/or add certain identifiers from the port forwarding and/or routing tables of network elements to adjust the utilization of at least one network. For example, the network controller 102 may compare a bandwidth capacity of the at least one network switch to a bandwidth demand measured at the at least one network switch. When it is determined that the bandwidth demand exceeds the bandwidth capacity, the controller reprograms the at least one network switch to reduce a number of identifiers in the list of identifiers 154. Within the analysis of modeling system 114, some nodes may be dedicated to receiving data transmitted to the system 114 (e.g., ingress nodes). The network controller may transmit filters or other mechanisms via the control plane to the network fabric to limit the number of packets of a flow, or what portion of a packet would be sent to the system 114 to avoid overrunning the ingress capabilities of the system 114. When a node is determined to be communicating with the seed node, an identifier corresponding to the node is added to a list of the identifiers (e.g., a table) used by the network fabric. By continuing to iteratively execute this process, over time, the network controller and/or the system 114 may identify a (complete) list of the identifiers relevant to a particular IT system and/or business process.

The analysis and modeling system 114 may retrieve the copies of the data packets and the corresponding timestamps from a memory element. The analysis and modeling system 114 may analyze the data packets and the corresponding timestamps to generate an information model of a business process (e.g., in a manner similar to that described with respect to 414 and 416 (FIG. 4) and/or 308 (FIG. 3)). The data packets and the corresponding timestamps are processed by the analysis and modeling system 114 using data analysis techniques (e.g., including machine learning algorithms) to determine information including (but not limited to), e.g.: relationships between nodes, relationships between data packets, typical time delays between the various communications flows between nodes, any external or extraneous communication that might occur to external systems or via out of band communications methods, anomalous delays related to specific times or specific hosts, visualizations of this data for human consumption/analysis, subsets of this data for external analysis, and/or other relevant information about the IT systems and process observed. Based upon this information, the system 114 can provide compare the business process against benchmarks. A business or network operator can make changes to the communication system 100 and/or business policies to improve the efficiency of the modeled business processes relative to the benchmarks. In some examples, the system 114 may use such comparisons to benchmarks to automatically (e.g., without operator intervention) instantiate or decommission nodes in the network 104 (e.g., alleviate conditions such as saturated server resources and/or to reduce a demand measured at a network element to a value that is equal to or less than a bandwidth capacity of the network element).

Due to the fast pace of technological advances in data analysis (e.g., machine learning), the systems disclosed herein can easily incorporate myriad analysis methods. For example, human assisted machine learning (e.g., trained machine learning algorithms) may be used to develop an expert system based on the data retrieved by the system 114 from the network fabric. The system 114 may identify relationships between external conditions (e.g., market demand or macro-economic conditions) and business processes. For example, the system may predict growth of a business based on a correlation between the external conditions and a number of instances of a business process (e.g., where the number of instances of business processes is used to estimate (positive or negative) growth of the business). Using such a correlation, the system can simulate future business growth by providing an input of the external conditions. Using such a simulation, the system 114 can identify where problems (e.g., potential bottlenecks in the communication system 100 and/or business processes) that limit business growth (e.g., especially in cases where the external conditions would support positive business growth). The system could additionally provide results of such a simulation into other systems to analyze other areas of the business and external conditions and/or generate other statistics indicative of growth prospects of the business.

It is noted that some of the examples disclosed herein utilize a network fabric that includes a control plane and a data plane. Moreover, a programmable interface may be utilized to: provide data including source addresses, destination addresses, and/or timestamps; replicate data packets including data payload; and/or decrypt/encrypt data retrieved from the data packets. In some examples, the programmable interface may be an access control list (ACL). The network fabric may use such an interface to copy/transmit data traffic to the analysis and modeling system 114. It is noted that the analysis and modeling system 114 may be implemented on a single node or load balanced across a set of nodes.

Based on the results of analyzing the data packets, the analysis and modeling system 114 may direct the network fabric to replicate other network in (near) real-time to build a model of specific business processes. Because the data packets are traversing the network fabric, and the network fabric can identify a time at which each data packet leaves one node and/or a time at which each data packet enters another node. Thus, the times may be used by the system 114 to model a complete instance of a business process including delays in each step of the instance of the business process.

The analysis and modeling system 114 may monitor network elements to determined whether the network elements are received more data traffic than they can handle. For example, any retransmissions or duplications of data packets may indicate that the network element is being over-utilized. When it is detected that a network element has dropped a packet, the system 114 may reduce the bandwidth of data being sent to the network element. For example, the system 114 may retrieve (e.g., via the network controller 102) a bandwidth capacity of the network element and a bandwidth demand that the network element is experiencing (e.g., in real time). The system 114 compares the bandwidth capacity to the bandwidth demand. When it is determined that the bandwidth demand exceeds the bandwidth capacity, the controller reprograms the at least one network switch to reduce the bandwidth demand to a value that is less than or equal to the bandwidth capacity (e.g., by scaling down number of identifiers in a list of identifiers based on a ratio of bandwidth demand to bandwidth capacity).

The analysis and modeling system 114 may generate rules based on trends identified in the business processes. In addition, the system 114 may (proactively) identify any potential network congestion created by implementing such a rule. A metric may be used to benchmark particular instances of a business process relative to an average instance of the business process. Using such metrics, the system 114 may identify statistical outliers. The outliers may be identified in an alert rendered in a graphical user interface. The alert may further indicate that the outlier may benefit from process changes or user intervention. In one example, the system 114 determines that 90% of transactions associated with a same business process are delayed by waiting for human approvals and that, for the 90% that are delayed, nearly all process receive approval (e.g., about 98-100% of the time). The system 114 may generate a rule that automatically provides such approvals (e.g., since nearly all are approved anyway). However, before implementing the rule, the system 114 may simulate the effects of implementing the rule (e.g., to automatically provide such approvals and removing the human approval). The a new business process can be modeled as an amended version of the model of the exiting process (e.g., wherein the new model eliminates a step that was delayed by the human approval) and simulated in the communication system 100 to determine whether any new issues arise (e.g., to determine whether any new steps of the process become delayed). For example, if removing (and automating) the approval causes a server to become oversubscribed, the system 114 can use the simulation to identify this risk (in advance) so that additional resources could be put in place prior to the rule being implemented.

The analysis and modeling system 114 can access clear text data that is not encrypted regardless of whether packets in the network are encrypted. Encrypted networks provide SSL termination within the network fabric. For example, the traffic from server to fabric would be encrypted, then decrypted for transmission across the fabric, then re-encrypted on egress to the client whose SSL terminates at the fabric as well. Thus, although the data may be encrypted when in transmission to/from a client or server, the system 114 accesses content of the traffic (e.g., payloads, and other fields of data packets) in the clear (i.e., unencrypted).

As further illustration of an application of the systems disclosed herein, consider the examples of FIGS. 5A-5C in the context of a company that produces sprockets and has a single sales person and sales manager, shipping manager, and finance manager. When the sales person receives and order via telephone (e.g., as generally depicted by the data flow for the VoIP call from endpoint 110c to endpoint 110d in FIG. 5A), the order is placed into a web based application where it is routed to his manager for approval (e.g., as generally depicted by the data flow for the order entry from endpoint 110d to server 112a in FIG. 5B). The manager may use his tablet (e.g., endpoint 110b) to approve the order (e.g., as generally depicted by the data flow for the approval sent from endpoint 110b to server 112a in FIG. 5C). Once approved by the manager, the order is routed to a finance manager to approve price discounts. Once approved by the financial manager, the order is routed to a shipping manager. The shipping manager uses an Internet based application to estimate a shipping date and a final cost of the order including shipping charges. The shipping manager also calls a mail carrier to determine when the shipment will arrive at the customer. Once this information is added back to the order in the system, the shipping manager sends an email to the sales person with the details. The sales person calls the customer with an updated final price including shipping and an estimated delivery date. For the sake of brevity, only the first three steps of the business process are illustrated in the FIGS. 5A-5C. However, it is noted that similar data flows (and copies of data packets) are generated for each step of the business process as discussed with respect to the FIGS. 5A-5C. At the end of the month, the finance manager runs a report on the system 114 that shows accounts receivable including this order. The finance manager uses this report to calculate commissions owed to the sales person and to prepare a report of the previous month's sales to the sales manager (e.g., sent via an email attachment).

All aspects of this transaction and resulting in a generation of packets that traverse the network fabric (e.g., including the telephone call, email, web based interactions with backend systems, intercommunications of those backend systems, out of band systems such as checking an Internet based shipping calculator, and other systems). By ingesting all of these packets into the analysis and modeling system 114 and analyzing (e.g., using a machine learning algorithm) the data including timestamps, the analysis and modeling system 114 may determine the following statistics:

The Sales Manager approves 99% of orders. A clustering algorithm executed on the transactions may reveal that 100% of orders under $10,000 are approved, 89% of orders over $50,000 are rejected and resubmitted;

43% of the time a phone call originates from the sales person to the shipping manager within 1.2 days of the order being approved by the Sales Manager;

Orders are delayed an average of 2 days at the Finance Manager;

Average orders take 5.7 days from telephone call between customer and sales person and arriving at customer, and 34.7 days to receive payment from customer; and From opening the web session to closing the web session while a sales person is placing an order takes an average of 25 minutes, with an average of 15 minutes due to client side processing latency and 5 minutes between the application logic and database tiers.

Based on these statistics, automated alerts and reminders could eliminate manual telephone calls from the salesperson to the shipping manager. A PC upgrade for the salesperson would reduce order entry time. A second database server could be added to improve processing delay. Automated order filtering would remove the Sale Manager and Financial Manager from the approval process for all orders under $10,000 provided the discount percentages met certain criteria. An automated shipping cost calculation system would be put in place between the company system and their carrier to include reporting of the delivery date. An automated system would be installed to notify the end customer of the final price with shipping and expected delivery date. All of the efficiencies gained would then be measured going forward to reveal that the average order now takes 31.7 days from original telephone call to receive payment. Additional efficiencies could be identified based on the new data seen through the systems on an ongoing basis.

Within the context of the disclosure, a network used herein represents a series of points, nodes, hosts, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

Endpoints 110a-d are representative of any type of client device to communicating in communication system 100. Furthermore, endpoints 110a-d can be associated with individuals, clients, customers, or end users. The term 'endpoint' is inclusive of devices used to initiate a communication, such as a computer, a personal digital assistant (PDA), a laptop or electronic notebook, a cellular telephone (e.g., an IPHONE, an IP phone, a BLACKBERRY, a GOOGLE DROID), a tablet (e.g., an IPAD), or any other device, component, element, network element, or object capable of initiating voice, audio, video, media, and/or data exchanges within communication system 100. Endpoints 110a-d may also be inclusive of a suitable interface to the human user, such as a microphone, a display, or a keyboard or other terminal equipment. Endpoints 110a-d may also be any device that seeks to initiate a communication on behalf of another entity or element, such as a program, a conferencing device, a database, or any other component, device, element, or object capable of initiating an exchange within communication system 100. Data, as used herein in this document, refers to any type of numeric, voice, messages, video, media, or script data, or any type of source or object code, or any other suitable information in any appropriate format that may be communicated from one node to another.

As used herein in this Specification, the term 'network element' is meant to encompass any of the aforementioned elements, as well as servers (physical or virtual), clients (physical or virtual), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the modeling operations thereof. This may be inclusive of appropriate algorithms and communication protocols that allow for the effective exchange of data or information. As used herein in this Specification, the term 'node' in inclusive of an endpoint and/or a network element.

In one implementation, analysis and modeling systems described herein may include software to achieve (or to foster) the functions discussed herein for generating models of business processes where the software is executed on one or more processors to carry out the functions. This could include the implementation of instances of processing elements, network switches, visualization elements, and/or any other suitable element that would foster the activities discussed herein. Additionally, each of these elements can have an internal structure (e.g., a processor, a memory element, etc.) to facilitate some of the operations described herein. In other embodiments, these functions for generating models of business processes may be executed externally to these elements, or included in some other network element to achieve the intended functionality. Alternatively, analysis and modeling systems fabric may include software (or reciprocating software) that can coordinate with other network elements in order to achieve the business process modeling functions described herein. In still other embodiments, one or several devices may include any suitable algorithms, hardware, software, components, modules, interfaces, or objects that facilitate the operations thereof.

In certain example implementations, the business process modeling functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein (e.g., including but not limited to operations disclosed with respect to logic 300 and/or 400). This includes the memory element being able to store instructions (e.g., software, code, etc.) that are executed to carry out the activities described in this Specification. The memory element is further configured to store databases such as data storage and business model databases to enable business process modeling functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the business process modeling, as outlined herein. Additionally, each of these devices may include a processor that can execute software or an algorithm to perform the bandwidth and/or processing load estimation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using LISP routing for migration, as potentially applied to a myriad of other architectures.

It is also important to note that the steps in the FIGS. 3, 4, and 5A, 5B, and 5C illustrate only some of the possible scenarios that may be executed by, or within, the analysis and modeling systems described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving an input of an identifier, wherein the identifier corresponds to a node in a network;
   recursively tracing data packets in the network, wherein the identifier is utilized as a seed for the tracing and serves as a beginning of a list of identifiers that grows based on the tracing;
   receiving an update to the list of identifiers, the update containing additional identifiers added to the list of identifiers;
   reprogramming at least one network switch based on receipt of the update; and
   generating an information model of a business process based on the data packets.

2. The method of claim 1, wherein the recursively tracing data packets in the network comprises:
   identifying, based on the identifier, data packets transferred between the node and one or more nodes;
   retrieving, from the data packets, one or more of the additional identifiers corresponding to the one or more nodes; and
   identifying, based on the one or more retrieved additional identifiers, additional data packets transferred between the one or more nodes and one or more additional nodes.

3. The method of claim 2, wherein the generating the information model of the business process based on the data packets comprises:
   identifying a correspondence between at least one of the data packets and at least one of the additional data packets; and
   generating the information model of the business process based on the correspondence.

4. The method of claim 1, further comprising:
   programming, by a controller, the at least one network switch to generate a copy of each of the data packets; and
   transmitting, to one or more servers, the copy of each of the data packets.

5. The method of claim 4, wherein the programming of the at least one network switch comprises:
   updating a switching table to include an instruction to direct the copy of each of the data packets to the one or more servers.

6. The method of claim 1, further comprising:
   storing a copy of the data packets and timestamps associated with the data packets.

7. The method of claim 3, wherein the identifying the correspondence between the at least one of the data packets and the at least one of the additional data packets comprises:
   analyzing, using a machine learning algorithm, the data packets and the additional data packets, wherein the machine learning algorithm generates an output identifying a transaction corresponding to a portion of the business process, wherein the analyzing comprises:
   retrieving a first payload of the at least one of the data packets;
   retrieving a second payload of the at least one of the additional data packets;
   determining that the first payload corresponds to the second payload;
   linking the at least one of the data packets to a linear series of data packets based on the determination; and
   generating the transaction based on the linear series of data packets.

8. The method of claim 1, wherein the reprogramming comprises:
   comparing a bandwidth capacity of said at least one network switch to a bandwidth demand measured at the at least one network switch; and
   when it is determined that the bandwidth demand exceeds the bandwidth capacity, reprogramming, by a controller, the at least one network switch to reduce a number of identifiers in the list of identifiers.

9. A system comprising:
   a memory element storing electronic code; and
   a processor coupled to the memory element and operable to execute the electronic code, wherein the processor, when executing the electronic code, performs operations comprising:
   receiving an input of an identifier, wherein the identifier corresponds to a node in a network;

recursively tracing data packets in the network, wherein the identifier is utilized as a seed for the tracing and serves as a beginning of a list of identifiers that grows based on the tracing;

receiving an update to the list of identifiers, the update containing additional identifiers added to the list of identifiers;

reprogramming at least one network switch based on receipt of the update; and generating an information model of a business process based on the data packets.

10. The system of claim 9, wherein the recursively tracing data packets in the network comprises:

identifying, based on the identifier, data packets transferred between the node and one or more nodes;

retrieving, from the data packets, one or more of the additional identifiers corresponding to the one or more nodes; and identifying, based on the one or more retrieved additional identifiers, additional data packets transferred between the one or more nodes and one or more additional nodes.

11. The system of claim 10, wherein the generating the information model of the business process based on the data packets comprises:

identifying a correspondence between at least one of the data packets and at least one of the additional data packets; and generating the information model of the business process based on the correspondence.

12. The system of claim 9, further comprising:
a controller performing additional operations comprising:
programming the at least one network switch to generate a copy of each of the data packets; and transmitting, to one or more servers, the copy of each of the data packets.

13. The system of claim 12, wherein the programming of the at least one network switch comprises:

updating a switching table to include an instruction to direct the copy of each of the data packets to the one or more servers.

14. The system of claim 9, wherein the operations further comprise:

storing a copy of the data packets and timestamps associated with the data packets.

15. The system of claim 11, wherein the identifying the correspondence between the at least one of the data packets and the at least one of the additional data packets comprises:

analyzing, using a machine learning algorithm, the data packets and the additional data packets, wherein the machine learning algorithm generates an output identifying a transaction corresponding to a portion of the business process, wherein the analyzing comprises:

retrieving a first payload of the at least one of the data packets;

retrieving a second payload of the at least one of the additional data packets;

determining that the first payload corresponds to the second payload;

linking the at least one of the data packets to a linear series of data packets based on the determination; and generating the transaction based on the linear series of data packets.

16. The system of claim 9, wherein the reprogramming comprises:

comparing a bandwidth capacity of said at least one network switch to a bandwidth demand measured at the at least one network switch; and when it is determined that the bandwidth demand exceeds the bandwidth capacity, reprogramming, by a controller, the at least one network switch to reduce a number of identifiers in the list of identifiers.

17. A computer-readable non-transitory medium comprising one or more instructions, that when executed on a processor configure the processor to perform one or more operations comprising:

receiving an input of an identifier, wherein the identifier corresponds to a node in a network;

recursively tracing data packets in the network, wherein the identifier is utilized as a seed for the tracing and serves as a beginning of a list of identifiers that grows based on the tracing;

receiving an update to the list of identifiers, the update containing additional identifiers added to the list of identifiers;

reprogramming at least one network switch based on receipt of the update; and generating an information model of a business process based on the data packets.

18. The computer-readable non-transitory medium of claim 17, wherein the recursively tracing data packets in the network comprises:

identifying, based on the identifier, data packets transferred between the node and one or more nodes;

retrieving, from the data packets, one or more of the additional identifiers corresponding to the one or more nodes; and identifying, based on the one or more retrieved additional identifiers, additional data packets transferred between the one or more nodes and one or more additional nodes.

19. The computer-readable non-transitory medium of claim 18, wherein the generating the information model of the business process based on the data packets comprises:

identifying a correspondence between at least one of the data packets and at least one of the additional data packets; and generating the information model of the business process based on the correspondence.

20. The computer-readable non-transitory medium of claim 17, wherein the reprogramming comprises:

comparing a bandwidth capacity of said at least one network switch to a bandwidth demand measured at the at least one network switch; and when it is determined that the bandwidth demand exceeds the bandwidth capacity, reprogramming, by a controller, the at least one network switch to reduce a number of identifiers in the list of identifiers.

* * * * *